United States Patent
Ono et al.

(10) Patent No.: US 10,071,740 B2
(45) Date of Patent: Sep. 11, 2018

(54) VEHICLE CONTROL APPARATUS, AND METHOD OF CONTROLLING SAME

(71) Applicant: Nissan Motor Co., Ltd., Kanagawa (JP)

(72) Inventors: Masashi Ono, Kanagawa (JP); Takahiro Yoshino, Kanagawa (JP); Yuuzou Kageyama, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/647,762

(22) PCT Filed: Oct. 3, 2013

(86) PCT No.: PCT/JP2013/076904
§ 371 (c)(1),
(2) Date: May 27, 2015

(87) PCT Pub. No.: WO2014/083937
PCT Pub. Date: Jun. 5, 2014

(65) Prior Publication Data
US 2015/0314787 A1    Nov. 5, 2015

(30) Foreign Application Priority Data
Nov. 27, 2012 (JP) ................. 2012-258689

(51) Int. Cl.
*B60W 30/188*    (2012.01)
*B60W 10/06*     (2006.01)
(Continued)

(52) U.S. Cl.
CPC ........ *B60W 30/1882* (2013.01); *B60W 10/06* (2013.01); *B60W 10/101* (2013.01);
(Continued)

(58) Field of Classification Search
CPC .... F16H 59/62; F16H 61/1497; F02D 11/105; F02D 29/02; B60W 10/04; B60W 10/06;
(Continued)

(56) References Cited

U.S. PATENT DOCUMENTS 4,642,068 A * 2/1987 Osanai .............. F16H 61/66259
474/11
4,795,015 A * 1/1989 Hibino .................. F16H 61/143
192/3.29
(Continued)

FOREIGN PATENT DOCUMENTS

CN    102574523 A    7/2012
JP    H08-136369 A    5/1996
(Continued)

OTHER PUBLICATIONS

International Search Report issued in PCT/JP2013/076904 dated Dec. 24, 2013 (2 pages).
(Continued)

*Primary Examiner* — Jacob Amick
*Assistant Examiner* — Michael A Kessler
(74) *Attorney, Agent, or Firm* — Osha Liang LLP

(57) ABSTRACT

A vehicle control apparatus includes: a first target driving force calculation unit that calculates a first target driving force based on an accelerator pedal opening; a target speed ratio calculation unit that calculates a target speed ratio of a continuously variable transmission based on the first target driving force; a target torque calculation unit that calculates a target torque of a driving source based on the first target driving force; an air density detection unit that detects air density; and a first correction unit that corrects only the target torque, out of the target speed ratio and the target torque, in accordance with the air density.

13 Claims, 5 Drawing Sheets

(51) Int. Cl.
*B60W 10/101* (2012.01)
*B60W 30/14* (2006.01)
*B60W 10/107* (2012.01)
*F16H 59/18* (2006.01)
*F16H 61/02* (2006.01)
*F02D 29/00* (2006.01)
*F02D 11/10* (2006.01)
*F16H 61/66* (2006.01)

(52) U.S. Cl.
CPC .......... *B60W 10/107* (2013.01); *B60W 30/14* (2013.01); *F02D 11/105* (2013.01); *F02D 29/00* (2013.01); *F16H 59/18* (2013.01); *F16H 61/02* (2013.01); *F16H 61/66* (2013.01); *B60W 2510/0604* (2013.01); *B60W 2510/1045* (2013.01); *B60W 2540/10* (2013.01); *B60W 2550/12* (2013.01); *B60W 2710/0666* (2013.01); *F02D 2200/703* (2013.01); *F02D 2250/18* (2013.01); *F02D 2400/12* (2013.01); *F16H 2061/6604* (2013.01)

(58) Field of Classification Search
CPC .......... B60W 301/188; B60W 10/107; B60W 30/14; Y10T 477/68; B60L 2240/66
USPC ................ 701/54, 65, 93, 110; 477/107; 123/406.23
See application file for complete search history.

(56) References Cited

U.S. PATENT DOCUMENTS

| | | | |
|---|---|---|---|
| 4,803,966 A | | 2/1989 | Denz |
| 4,947,971 A | * | 8/1990 | Tanaka ................ B60W 10/02 192/103 R |
| 4,961,315 A | * | 10/1990 | Ishikawa ................ F16H 59/62 477/68 |
| 5,069,083 A | * | 12/1991 | Hirano ................ B60W 10/02 477/39 |
| 5,317,937 A | * | 6/1994 | Yoshizawa .......... F16H 61/0213 477/120 |
| 6,181,020 B1 | | 1/2001 | Uchida et al. |
| 6,188,943 B1 | | 2/2001 | Uchida et al. |
| 6,367,447 B1 | | 4/2002 | Palansky et al. |
| 6,389,348 B1 | * | 5/2002 | Takagi ................ B60K 6/543 701/51 |
| 7,092,807 B2 | * | 8/2006 | Burk ...................... F16H 59/66 701/51 |
| 7,280,895 B2 | * | 10/2007 | Mabuchi ............ B60K 31/0066 340/438 |
| 8,509,980 B2 | * | 8/2013 | Abe ........................ B60K 6/48 701/22 |
| 2012/0185119 A1 | | 7/2012 | Abe et al. |

FOREIGN PATENT DOCUMENTS

| | | |
|---|---|---|
| JP | H09-287507 A | 11/1997 |
| JP | H11-1135 A | 1/1999 |
| JP | 2001-138776 A | 5/2001 |
| JP | 2002-256959 A | 9/2002 |
| JP | 2008-267467 A | 11/2008 |
| JP | 2009-173235 A | 8/2009 |
| JP | 2012-086770 A | 5/2012 |

OTHER PUBLICATIONS

Written Opinion of the International Searching Authority issued in PCT/JP2013/076904 dated Dec. 24, 2013 (3 pages).
International Preliminary Report on Patentability from PCT/JP2013/076904 dated Jun. 13, 2014 (9 pages).

* cited by examiner

VEHICLE CONTROL APPARATUS, AND METHOD OF CONTROLLING SAME

CROSS-REFERENCE TO RELATED APPLICATIONS

The present application is a national stage application of PCT Application No. PCT/JP2013/076904, filed Oct. 3, 2013, which claims the benefit of priority from Japanese Patent Application No. 2012-258689, filed Nov. 27, 2012, the disclosure of which are incorporated herein by reference in their entirety.

BACKGROUND

Technical Field

The present invention relates to a vehicle control apparatus and a method for controlling the same.

Related Art

JP 2009-173235A discloses a conventional technique to correct a driving force in accordance with the atmospheric pressure, and control an engine based on the corrected driving force.

SUMMARY OF INVENTION

However, with the aforementioned conventional technique, a target torque of the engine and a target rotation speed of the engine are set based on the corrected driving force. Therefore, with the same amount of depression of an accelerator pedal by a driver, the target rotation speed changes between when the atmospheric pressure is high and when the atmospheric pressure is low. This could possibly make the driver feel a sense of discomfort.

One or more embodiments of the present invention alleviates a sense of discomfort felt by a driver by suppressing a change in a target rotation speed of an engine when the amount of depression of an accelerator pedal by the driver is substantially constant under various atmospheric pressures.

A vehicle control apparatus according to one or more embodiments of the present invention includes: a first target driving force calculation unit configured to calculate a first target driving force based on an accelerator pedal opening; a target speed ratio calculation unit configured to calculate a target speed ratio of a continuously variable transmission based on the first target driving force; a target torque calculation unit configured to calculate a target torque of a driving source based on the first target driving force; an air density detection unit configured to detect air density; and a first correction unit configured to correct only the target torque, out of the target speed ratio and the target torque, in accordance with the air density.

DETAILED DESCRIPTION

The following describes embodiments of the present invention with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
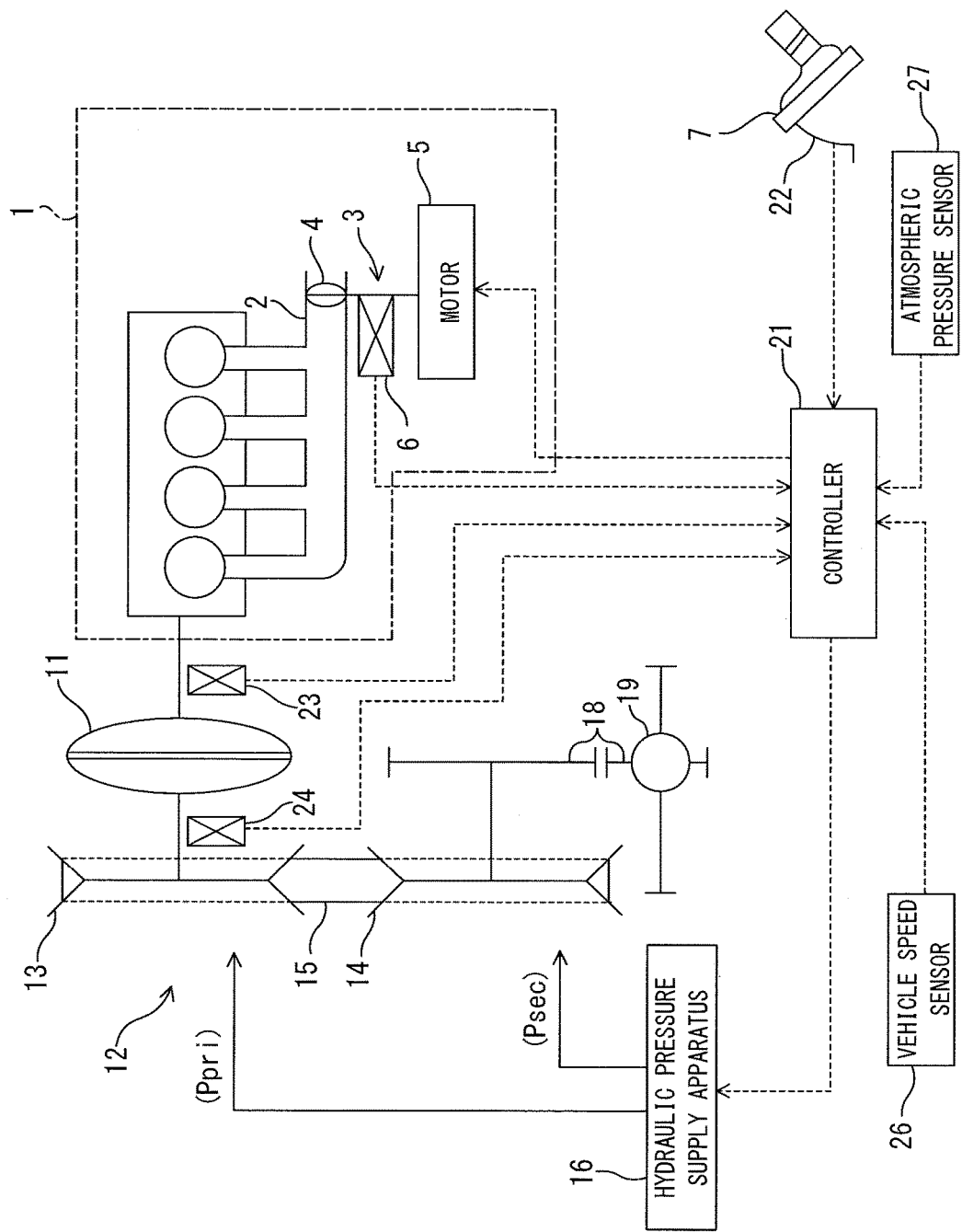
FIG. 1 is a schematic configuration diagram of a vehicle according to a first embodiment.

A configuration according to a first embodiment of the present invention will now be described with reference to FIG. 1.

The output from an engine 1 of a vehicle is input to a continuously variable transmission 12 via a torque converter 11. The continuously variable transmission 12 includes a primary pulley 13, a secondary pulley 14, and a V belt 15 wound around the pulleys 13 and 14. The primary pulley 13 changes the radius of contact with the V belt 15 by changing a groove width in accordance with a hydraulic pressure Ppri. The secondary pulley 14 changes the radius of contact with the V belt 15 by changing a groove width in accordance with a hydraulic pressure Psec. As a result, the continuously variable transmission 12 continuously changes the ratio between the input rotation speed and the output rotation speed, that is to say, the speed ratio in accordance with control of the hydraulic pressure Ppri and the hydraulic pressure Psec. The hydraulic pressure Ppri and the hydraulic pressure Psec are generated by a hydraulic pressure supply apparatus 16.

The secondary pulley 14 is coupled to drive wheels via a final gear 18 and a differential 19.

The engine 1 includes an intake throttle apparatus 3 that adjusts an intake amount. The intake throttle apparatus 3 includes an intake throttle 4 provided in an intake passage 2 of the engine 1, and an electric motor 5 that changes the opening of the intake throttle 4 in accordance with an input signal.

The hydraulic pressure supply apparatus 16 and the intake throttle apparatus 3 operate in accordance with instruction signals output from a controller 21.

The controller 21 is composed of a microcomputer provided with a central processing unit (CPU), a read-only memory (ROM), a random-access memory (RAM), and an input/output (I/O) interface. The controller 21 can be composed of a plurality of microcomputers.

The controller 21 receives, as input, detection signals from a throttle opening sensor 6, an accelerator pedal opening sensor 22, an engine rotation speed sensor 23, a primary pulley rotation speed sensor 24, a vehicle speed sensor 26, and an atmospheric pressure sensor 27. The throttle opening sensor 6 detects the throttle opening of the intake throttle 4. The accelerator pedal opening sensor 22 detects an accelerator pedal opening of an accelerator pedal 7 provided in the vehicle. The engine rotation speed sensor 23 detects a rotation speed of the engine 1. The primary pulley rotation speed sensor 24 detects a rotation speed of the primary pulley 13. The vehicle speed sensor 26 detects a running speed of the vehicle. The atmospheric pressure sensor 27 detects the atmospheric pressure.

The controller 21 controls a driving force of the vehicle by controlling the opening of the intake throttle 4 and controlling the shift of the continuously variable transmission 12 via the hydraulic pressure supply apparatus 16 in accordance with these detection signals.

Figure 2:
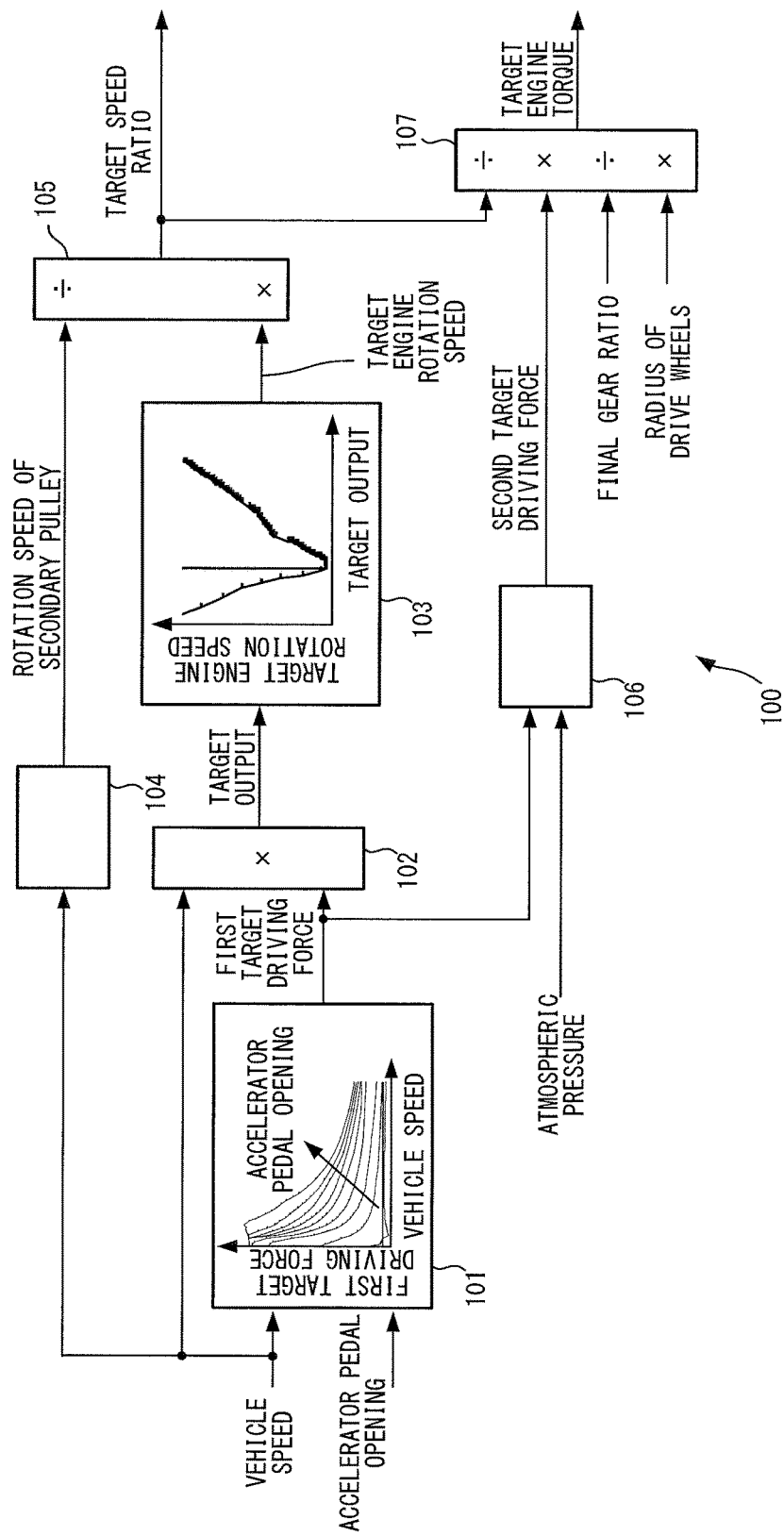
FIG. 2 shows control blocks for setting a target speed ratio and a target engine torque in the first embodiment.

With reference to a control block diagram of FIG. 2, a description is now given of a setting unit 100 according to the first embodiment, which sets a target speed ratio and a target engine torque. The following control is performed by the controller 21.

The setting unit 100 is composed of a target driving force calculation unit 101, a target output calculation unit 102, a target engine rotation speed calculation unit 103, a target output rotation speed calculation unit 104, a target speed ratio calculation unit 105, an atmospheric pressure correction unit 106, and a target engine torque calculation unit 107.

The target driving force calculation unit 101 calculates a first target driving force from a map that has been set in advance based on a vehicle speed and an accelerator pedal opening. The vehicle speed is detected based on the detection signal from the vehicle speed sensor 26. The accelerator pedal opening is detected based on the detection signal from the accelerator pedal opening sensor 22.

The target output calculation unit 102 calculates the target output by multiplying the first target driving force by the vehicle speed.

The target engine rotation speed calculation unit 103 calculates a target engine rotation speed from a map that has been set in advance based on the target output.

The target output rotation speed calculation unit 104 calculates a rotation speed of the secondary pulley 14 of the continuously variable transmission 12 based on the vehicle speed.

The target speed ratio calculation unit 105 calculates a target speed ratio by dividing the target engine rotation speed by the rotation speed of the secondary pulley 14. The target engine rotation speed is not influenced by the atmospheric pressure because it is calculated based on the first target driving force. Therefore, the target speed ratio does not change even under various atmospheric pressures.

The atmospheric pressure correction unit 106 calculates a second target driving force from a map that has been set in advance based on the atmospheric pressure and the first target driving force. The atmospheric pressure is detected based on the detection signal from the atmospheric pressure sensor 27. The atmospheric pressure correction unit 106 calculates the second target driving force by correcting the first target driving force in accordance with the atmospheric pressure. The lower the atmospheric pressure, the smaller the second target driving force.

The target engine torque calculation unit 107 calculates a target engine torque by dividing a product of the second target driving force and the radius of the drive wheels by the target speed ratio and the final gear ratio. For example, in the case where the vehicle is running on a highland under low atmospheric pressure with low air density, the target engine torque is small compared to the case where the vehicle is running on a lowland under normal atmospheric pressure.

Figure 3:
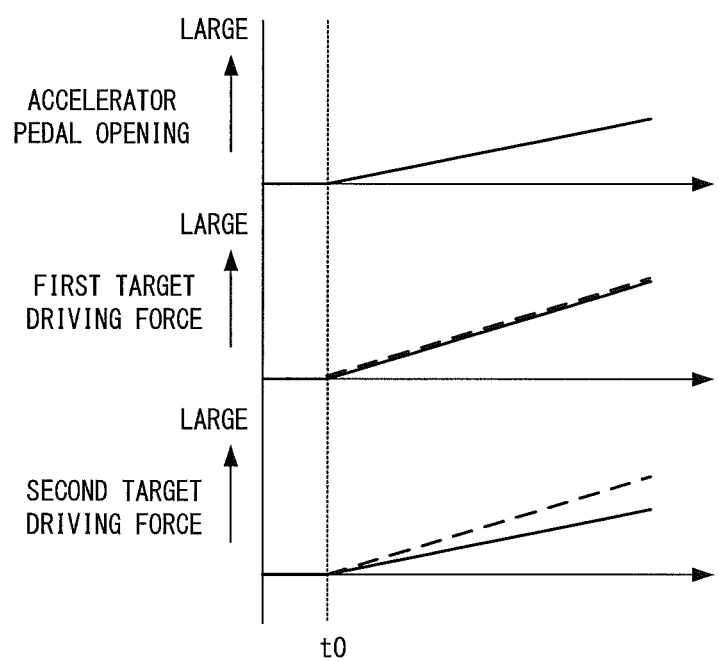
FIG. 3 is a time chart for describing a first target driving force and a second target driving force in the case of the first embodiment.

With reference to a time chart of FIG. 3, a description is now given of the first target driving force and the second target driving force in the case of the first embodiment. FIG. 3 shows changes in the accelerator pedal opening, the first target driving force, and the second target driving force in the case where the vehicle has started to run, on a highland, following the state of being stopped. In FIG. 3, dash lines indicate the driving forces pertaining to the case where the vehicle is running on a lowland with the same accelerator pedal opening.

At time t0, the accelerator pedal 7 is depressed and the vehicle starts to run. Consequently, the first target driving force and the second target driving force gradually increase. As the second target driving force is corrected based on the atmospheric pressure, the second target driving force becomes small compared to the target driving force pertaining to the case where the vehicle is running on a lowland. Accordingly, the target engine torque, which is calculated based on the second target driving force, becomes small compared to the target engine torque pertaining to the case where the vehicle is running on a lowland. On the other hand, as the first target driving force is not corrected based on the atmospheric pressure, the first target driving force has the same value as the target driving force pertaining to the case where the vehicle is running on a lowland. Accordingly, the target speed ratio, which is calculated based on the first target driving force, has the same value as the target speed ratio pertaining to the case where the vehicle is running on a lowland.

In the first embodiment, the first target driving force is calculated based on the accelerator pedal opening, and the target speed ratio is calculated based on the first target driving force. Meanwhile, the target engine torque is calculated based on the atmospheric pressure and the first target driving force. In this way, out of the target speed ratio and the target engine torque, only the target engine torque is calculated in consideration of the influence of the atmospheric pressure. Accordingly, the same target speed ratio is yielded even under various atmospheric pressures, e.g., whether the vehicle is running on a lowland or a highland, with the same accelerator pedal opening.

If the engine rotation speed changes under the influence of the atmospheric pressure while running with the same accelerator pedal opening, the driver may feel a sense of discomfort.

In the first embodiment, out of the target speed ratio and the target engine torque, only the target engine torque is calculated in consideration of the influence of the atmospheric pressure. This makes it possible to prevent the target speed ratio and the engine rotation speed from changing in accordance with the atmospheric pressure. Accordingly, the driver can be prevented from feeling a sense of discomfort.

A decrease in the atmospheric pressure leads to a decrease in the torque that can be output from the engine 1. Therefore, for example, in the case where the driver gradually depresses the accelerator pedal 7, there is a possibility that the engine torque is maximized mid-course under the influence of the atmospheric pressure, and a subsequent depression of the accelerator pedal 7 yields a zero (small) torque increase. In the first embodiment, the target engine torque is calculated based on the atmospheric pressure. Therefore, under low atmospheric pressure, the target engine torque is reduced, and hence maximization of the engine torque is suppressed. This makes it possible to suppress the occurrence of a situation in which a depression of the accelerator pedal 7 yields a zero (small) torque increase.

A description is now given of a second embodiment of the present invention.

Figure 4:
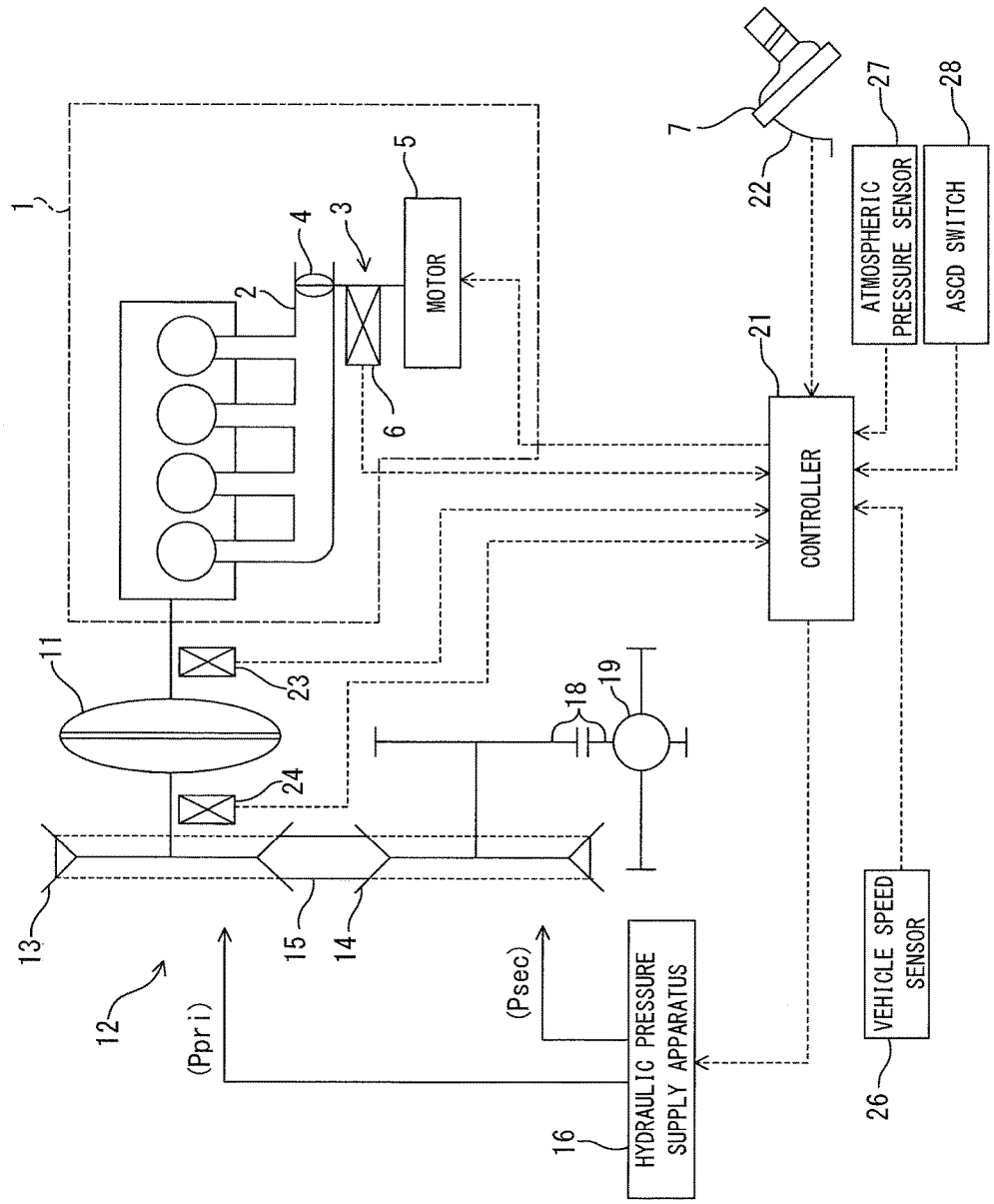
FIG. 4 is a schematic configuration diagram of a vehicle according to a second embodiment.

The portions of the second embodiment that are different from FIG. 1 will be described. As shown in FIG. 4, a vehicle according to the second embodiment includes an automatic speed control device (ASCD) switch 28 in addition to the constituents shown in FIG. 1. A controller 21 performs cruise control in accordance with operation on the ASCD switch 28.

Figure 5:
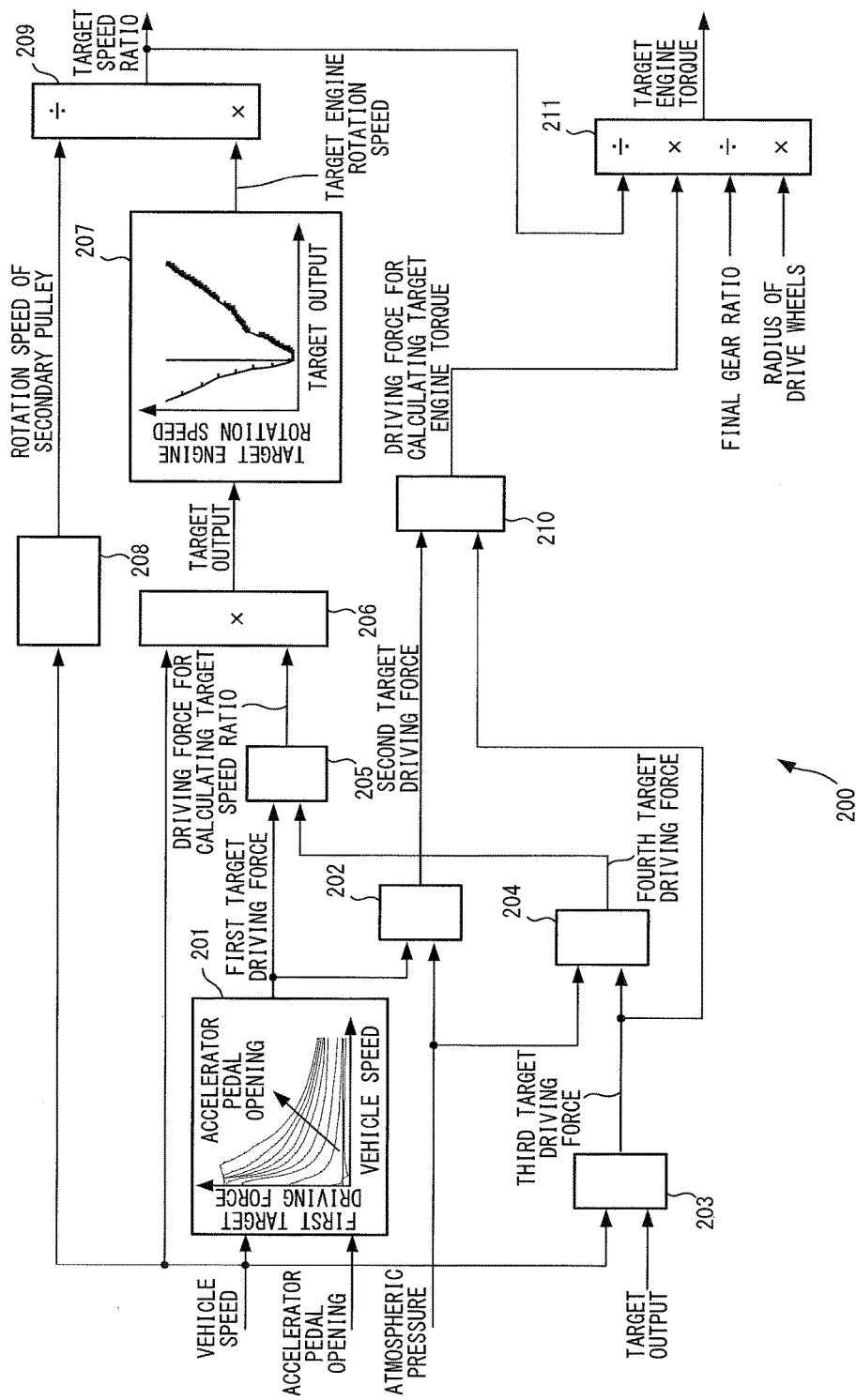
FIG. 5 shows control blocks for setting a target speed ratio and a target engine torque in the second embodiment.

With reference to a control block diagram of FIG. 5, a description is now given of a setting unit 200 according to the second embodiment, which sets a target speed ratio and a target engine torque. The following control is performed by the controller 21.

The setting unit 200 is composed of a target driving force calculation unit 201, an atmospheric pressure correction unit 202, a cruise control target driving force calculation unit 203, an atmospheric pressure inverse correction unit 204, a first target driving force selection unit 205, a target output calculation unit 206, a target engine rotation speed calculation unit 207, a target output rotation speed calculation unit 208, a target speed ratio calculation unit 209, a second target driving force selection unit 210, and a target engine torque calculation unit 211.

The target driving force calculation unit 201 calculates a first target driving force from a map that has been set in advance based on a vehicle speed and an accelerator pedal opening.

The atmospheric pressure correction unit 202 calculates a second target driving force from a map that has been set in advance based on the atmospheric pressure and the first target driving force.

The cruise control target driving force calculation unit 203 calculates a third target driving force, which is a target driving force during cruise control. The cruise control target driving force calculation unit 203 calculates the third target driving force based on a target vehicle speed at the time of cruise control and an actual vehicle speed. The cruise control target driving force calculation unit 203 calculates running resistance based on the target vehicle speed, uses this running resistance as a base target driving force, calculates a driving force that is further required from a deviation between the actual vehicle speed and the target vehicle speed, and calculates the third target driving force by adding the target driving force and the driving force that is further required. The third target driving force reflects the influence of the atmospheric pressure of an environment in which the vehicle is currently running. For example, in the case where the vehicle is running on a highland under low atmospheric pressure, the third target driving force is small compared to the case where the vehicle is running on a lowland under normal atmospheric pressure.

The atmospheric pressure inverse correction unit 204 calculates a fourth target driving force by correcting the third target driving force based on the atmospheric pressure. The value of the fourth target driving force is not influenced by the atmospheric pressure of the environment in which the vehicle is currently running. For example, in the case where the vehicle is running on a highland under cruise control, the fourth target driving force is equivalent to the driving force pertaining to the case where the vehicle is running on a lowland under cruise control. More specifically, the fourth target driving force is equivalent to a driving force at 1 atm.

The first target driving force selection unit 205 selects a driving force for calculating a target speed ratio based on a signal from the ASCD switch 28. The first target driving force selection unit 205 selects the fourth target driving force as the driving force for calculating the target speed ratio when the ASCD switch 28 is ON, and selects the first target driving force as the driving force for calculating the target speed ratio when the ASCD switch 28 is OFF.

The target output calculation unit 206 calculates the target output by multiplying the driving force for calculating the target speed ratio by the vehicle speed.

The target engine rotation speed calculation unit 207 calculates a target engine rotation speed from a map that has been set in advance based on the target output.

The target output rotation speed calculation unit 208 calculates a rotation speed of a secondary pulley 14 of a continuously variable transmission. 12 based on the vehicle speed.

The target speed ratio calculation unit 209 calculates the target speed ratio by dividing the target engine rotation speed by the rotation speed of the secondary pulley 14. When the ASCD switch 28 is ON, the target speed ratio is calculated based on the fourth target driving force, which has been corrected so as not to be influenced by the atmospheric pressure. On the other hand, when the ASCD switch 28 is OFF, the target speed ratio is calculated based on the first target driving force, which is not influenced by the atmospheric pressure. Therefore, even under various atmospheric pressures, the target speed ratio does not change as long as other driving conditions remain the same.

The second target driving force selection unit 210 calculates a driving force for calculating a target engine torque based on a signal from the ASCD switch 28. The second target driving force selection unit 210 selects the third target driving force as the driving force for calculating the target engine torque when the ASCD switch 28 is ON, and selects the second target driving force as the driving force for calculating the target engine torque when the ASCD switch 28 is OFF.

The target engine torque calculation unit 211 sets the target engine torque by dividing a product of the driving force for calculating the target engine torque and the radius of drive wheels by the target speed ratio and the final gear ratio.

While running under cruise control, the fourth target driving force is calculated by correcting the third target driving force, which is the target driving force during cruise control, based on the atmospheric pressure so as not to be influenced by the atmospheric pressure. Then, the target speed ratio is calculated based on the fourth target driving force. This makes it possible to suppress a change in the target speed ratio under the influence of the atmospheric pressure when the state of the ASCD switch 28 is switched from ON to OFF. For example, at the time of the maximum accelerator pedal opening during cruise control, if the state of the ASCD switch 28 is switched from ON to OFF as a result of the driver depressing the accelerator pedal 7 so as to maximize the accelerator pedal opening, the driving force for calculating the target speed ratio does not change, and hence the target speed ratio does not change. Accordingly, for example, even in the case where the vehicle is running on a highland under low atmospheric pressure, it is possible to prevent the target speed ratio from changing under the influence of the atmospheric pressure when the state of the ASCD switch 28 is switched from ON to OFF, and to prevent the occurrence of shift-induced shock.

It should be noted that the above-described embodiments merely illustrate a part of application examples of the present invention, and are not intended to limit a technical scope of the present invention to specific configurations according to the above-described embodiments.

In one or more of the above-described embodiments, e.g., the first embodiment, the target engine torque is calculated based on the atmospheric pressure. However, no limitation is intended in this regard. The target engine torque may be calculated based on the factors that influence the air density, such as a temperature. In the second embodiment also, the fourth target driving force may be calculated based on the factors that influence the air density.

In the first embodiment, in order to correct the target engine torque based on the atmospheric pressure, the atmospheric pressure correction unit 106 calculates the second target driving force and the target engine torque is calculated based on the second target driving force. However, no limitation is intended in this regard as long as the target engine torque can be corrected in accordance with the atmospheric pressure. For example, the target engine torque may be calculated based on the first target driving force, and the value of the calculated target engine torque may be corrected in accordance with the atmospheric pressure. The same goes for the second embodiment.

Furthermore, in the second embodiment, while running under cruise control, the target speed ratio is corrected so as not to be influenced by the atmospheric pressure. Specifically, the atmospheric pressure inverse correction unit 204 calculates the fourth target driving force, and the target speed ratio is calculated based on the fourth target driving force. However, no limitation is intended in this regard as long as the target speed ratio can be corrected so as not to be influenced by the atmospheric pressure while running under cruise control. For example, the target speed ratio may be calculated based on the third target driving force, and the value of the calculated target speed ratio may be corrected so as not to be influenced by the atmospheric pressure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control apparatus for a vehicle, the vehicle comprising:
    an engine of the vehicle that is configured to output a driving force to a wheel of the vehicle, the engine comprising an intake throttle;
    a continuously variable transmission connected to the engine, the continuously variable transmission being configured to change a ratio between an input rotation speed and an output rotation speed;
    an accelerator pedal opening sensor configured to detect an accelerator pedal opening of an accelerator pedal; and
    an atmospheric pressure sensor configured to detect an atmospheric pressure,
    the vehicle control apparatus comprising:
        a first target driving force calculation unit configured to calculate a first target driving force based on the accelerator pedal opening detected by the accelerator pedal opening sensor;
        a target speed ratio calculation unit configured to calculate a target speed ratio of the continuously variable transmission based on the first target driving force;
        a target torque calculation unit configured to calculate a target torque of the engine based on the first target driving force; and
        a first correction unit configured to correct only the target torque of the target speed ratio and the target torque in accordance with the atmospheric pressure detected by the atmospheric pressure sensor,
        wherein the vehicle control apparatus is configured to control the intake throttle of the engine based on the corrected target torque, and control the continuously variable transmission based on the target speed ratio.

2. The vehicle control apparatus according to claim 1,
    wherein the first correction unit is configured to calculate a second target driving force by correcting the first target driving force based on the atmospheric pressure, and
    wherein the target torque calculation unit is configured to calculate the target torque based on the second target driving force.

3. A vehicle control apparatus for a vehicle, the vehicle comprising:
    an engine configured to output a driving force to a wheel of the vehicle, the engine comprising an intake throttle;
    a continuously variable transmission connected to the engine, the continuously variable transmission being configured to change a ratio between an input rotation speed and an output rotation speed;
    an accelerator pedal opening sensor configured to detect an accelerator pedal opening of an accelerator pedal;
    an atmospheric pressure sensor configured to detect an atmospheric pressure; and
    a switch configured to determine whether cruise control is performed or not,
    the vehicle control apparatus comprising:
        a first target driving force calculation unit configured to calculate a first target driving force based on the accelerator pedal opening detected by the accelerator pedal opening sensor;
        a cruise control target driving force calculation unit configured to calculate a third target driving force that is not dependent on the accelerator pedal opening in a case where the switch determines that the cruise control is performed;
        a target speed ratio calculation unit configured to calculate a target speed ratio of the continuously variable transmission based on the first target driving force;
        a target torque calculation unit configured to calculate a target torque of the engine based on the first target driving force or the third target driving force;
        a first correction unit configured to, when causing the vehicle to run based on the first target driving force, correct only the target torque of the target speed ratio and the target torque in accordance with the atmospheric pressure detected by the atmospheric pressure sensor; and
        a second correction unit configured to, when causing the vehicle to run based on the third target driving force, correct only the target speed ratio of the target speed ratio and the target torque in accordance with an atmospheric pressure of an environment in which the vehicle is running,
    wherein the vehicle control apparatus is configured to control the intake throttle of the engine and based on the target torque in a case where the switch determines that the cruise control is performed.

4. The vehicle control apparatus according to claim 3,
    wherein the second correction unit is configured to calculate a fourth target driving force by correcting the third target driving force based on the atmospheric pressure detected by the atmospheric pressure sensor, the fourth target driving force being uninfluenced by the atmospheric pressure of the environment in which the vehicle is running, and
    wherein, when causing the vehicle to run based on the third target driving force, the target speed ratio calculation unit is configured to calculate the target speed ratio based on the fourth target driving force.

5. A method of controlling a vehicle control apparatus for a vehicle, the method comprising:
calculating a first target driving force based on an accelerator pedal opening of an accelerator pedal of the vehicle;
calculating a target speed ratio of a continuously variable transmission of the vehicle based on the first target driving force;
calculating a target torque of an engine of the vehicle based on the first target driving force;
detecting an atmospheric pressure;
correcting only the target torque of the target speed ratio and the target torque in accordance with the atmospheric pressure;
controlling an intake throttle of the engine based on the corrected target torque; and
controlling the continuously variable transmission based on the target ratio.

6. A vehicle control apparatus for a vehicle, the vehicle comprising:
an engine configured to output a driving force to a wheel of the vehicle, the engine comprising an intake throttle;
a continuously variable transmission connected to the engine, the continuously variable transmission is configured to change a ratio between an input rotation speed and an output rotation speed;
an accelerator pedal opening sensor configured to detect an accelerator pedal opening of an accelerator pedal; and
an atmospheric pressure sensor configured to detect an atmospheric pressure,
the vehicle control apparatus comprising:
a first target driving force calculation means for calculating a first target driving force based on the accelerator pedal opening detected by the accelerator pedal opening sensor;
a target speed ratio calculation means for calculating a target speed ratio of the continuously variable transmission based on the first target driving force;
a target torque calculation means for calculating a target torque of the engine based on the first target driving force; and
a first correction means for correcting only the target torque of the target speed ratio and the target torque in accordance with the atmospheric pressure detected by the atmospheric pressure sensor,
wherein the vehicle control apparatus is configured to control the intake throttle of the engine based on the corrected target torque and control the continuously variable transmission based on the target speed ratio.

7. The vehicle control apparatus according to claim 3,
wherein the first correction unit is configured to calculate a second target driving force by correcting the first target driving force based on the atmospheric pressure, and
wherein the target torque calculating unit is configured to calculate the target torque based on the second target driving force.

8. A method of controlling a vehicle control apparatus for a vehicle, the method comprising:
determining whether cruise control is performed or not;
calculating a first target driving force based on an accelerator pedal opening detected by an accelerator pedal opening sensor;
calculating a third target driving force that is not dependent on the accelerator pedal opening in a case where a determination is made that the cruise control is performed;
calculating a target speed ratio of a continuously variable transmission based on the first target driving force;
calculating a target torque of an engine based on the first target driving force or the third target driving force;
when causing the vehicle to run based on the first target driving force, correcting only the target torque of the target speed ratio and the target torque in accordance with an atmospheric pressure detected by an atmospheric sensor;
when causing the vehicle to run based on the third target driving force, correcting only the target speed ratio of the target speed ratio and the target torque in accordance with an atmospheric pressure of an environment in which the vehicle is running; and
controlling an intake throttle of the engine based on the corrected target torque and control the continuously variable transmission based on the target speed ratio in a case where a determination is made that the cruise control is performed.

9. The vehicle control apparatus according to claim 1,
wherein the first correction unit is further configured to apply a decrease-correction to the target torque as the atmospheric pressure lowers.

10. The vehicle control apparatus according to claim 3,
wherein the first correction unit is further configured to apply a decrease-correction to the target torque as the atmospheric pressure lowers.

11. The method according to claim 5,
wherein correcting only the target torque comprises applying a decrease-correction to the target torque as the atmospheric pressure lowers.

12. The vehicle control apparatus according to claim 6,
wherein the first correction means comprises means for applying a decrease-correction to the target torque as the atmospheric pressure lowers.

13. The method according to claim 8,
wherein correcting only the target torque comprises applying a decrease-correction to the target torque as the atmospheric pressure lowers.

* * * * *